Oct. 17, 1961 M. E. BETTENHAUSEN 3,004,770
WEIGHT TRANSFER DEVICE FOR TRACTORS
Filed Sept. 16, 1958 2 Sheets-Sheet 1

INVENTOR
MELVIN E. BETTENHAUSEN
BY Brown, Jackson,
Boettcher & Dienner
ATTORNEYS Oct. 17, 1961  M. E. BETTENHAUSEN  3,004,770
WEIGHT TRANSFER DEVICE FOR TRACTORS
Filed Sept. 16, 1958  2 Sheets-Sheet 2

INVENTOR
MELVIN E. BETTENHAUSEN
BY Brown, Jackson,
Boettcher & Dienner
ATTORNEYS

# United States Patent Office 3,004,770
Patented Oct. 17, 1961

3,004,770
WEIGHT TRANSFER DEVICE FOR TRACTORS
Melvin E. Bettenhausen, 171st St. and 80th Ave., Tinley Park, Ill.; Valerie E. Bettenhausen, executrix of said Melvin E. Bettenhausen, deceased
Filed Sept. 16, 1958, Ser. No. 761,399
8 Claims. (Cl. 280—150)

This invention relates to tractors, and more particularly to a weight transfer device for such tractors to improve the performance of such tractors under operating conditions.

It is a general object of my invention to provide a new and improved weight transfer device particularly adapted to be employed in a conventional tractor to improve the performance of the tractor (whereby such tractor has improved traction characteristics) particularly when the tractor is tilted as in a furrow or on a slope.

Heretofore, one of the great problems in the operation of tractors for farming and the like, has been the problem of traction. This problem has resulted from the fact that, during operation, such as plowing, when tractor is following a furrow in the usual manner, one of the rear or driving wheels, is usually low and in the furrow, while the other rear or driving wheel is higher and on the unplowed ground. As a result, the tractor is tilted and the high driving wheel, which is on the unplowed ground, loses traction due to the loss of weight by reason of the tilting or transferring of weight toward the low wheel. This transfer of weight acting on the high wheel becomes particularly acute when the unplowed ground is moist or sandy or loose.

Known methods of overcoming this problem of traction are to suspend weights as from a bar attached to the body of the tractor so as to obtain a lever action bearing the tractor down on the unplowed ground, and/or to attach weights directly to the high wheel and/or to place liquid within the tire itself. The attachment of bars and weights to the body of the tractor or to the wheel itself are so common that many, if not all, tractor manufacturers supply the same as auxiliary equipment.

I have found that such auxiliary equipment is at best inefficient and particularly undesirable because it requires the continual loading and unloading of and attaching such weights to the tractor, and being heavy and large, are awkward to handle. Furthermore, the addition of the weights to the wheels or to the body of the tractor itself or to place liquid in the tires contribute to a packing of the earth prior to the plowing.

I have solved these problems by the provision of a weight transfer means on one or both sides of the conventional tractor so constructed and arranged as to exert an inclined force on the tractor from its low side which force is directed crosswise of the tractor. My device, therefore, transfers the weight of the tractor, which I have found to be ample for traction, from the low wheel to the high wheel so that traction is accomplished. In one embodiment of my invention my weight transfer means is in the form of an auxiliary wheel and cooperating equipment and in another embodiment my weight transfer device is a means which cooperates with one of the tractor's wheels to exert said force on the tractor.

My weight transfer means differs from conventional stabilizing means for preventing the tilting of the tractors and the like in that none of such stabilizing means are arranged to transmit a force or a torque whereby the tractor itself was urged upright thus forcing the high wheel down by the weight of the tractor. These conventional stabilizing means do not actually perform work themselves but are merely a form of balancing means.

As a still further improvement or further development of the one embodiment of devices utilizing an auxiliary wheel of my device, I have provided this wheel and its supplemental or cooperating equipment with a means by which the device may be projected or retracted as desired, and I have also provided means to permit effective steering thereof with the steering of the tractor.

Accordingly, it is a more particular object of my invention to provide a new and improved weight transfer device in the form of a new and improved weight transfer device in the form of an auxiliary wheel on conventional tractors and the like whereby the weight of the tractor normally transferred to the low wheel during operation on unlevel ground is transferred to the high wheel for better traction.

Still another object of my invention is the provision of a new and improved means whereby an auxiliary wheel may be retracted or projected into operation.

Another object of my invention is the provision of a new and improved weight transfer device in the form of an auxiliary wheel which is provided with a means permitting its retraction and projection and is further provided with the means permitting it to be steered according to the desires of the operator.

Still another object of my invention is the provision of a weight transfer device whereby one of the tractor wheels may be utilized to transfer the weight of the tractor for better traction.

Other and more particular objects of my invention will be apparent to those skilled in the art from the following description and drawings forming a part hereof and wherein.

Figure 1:
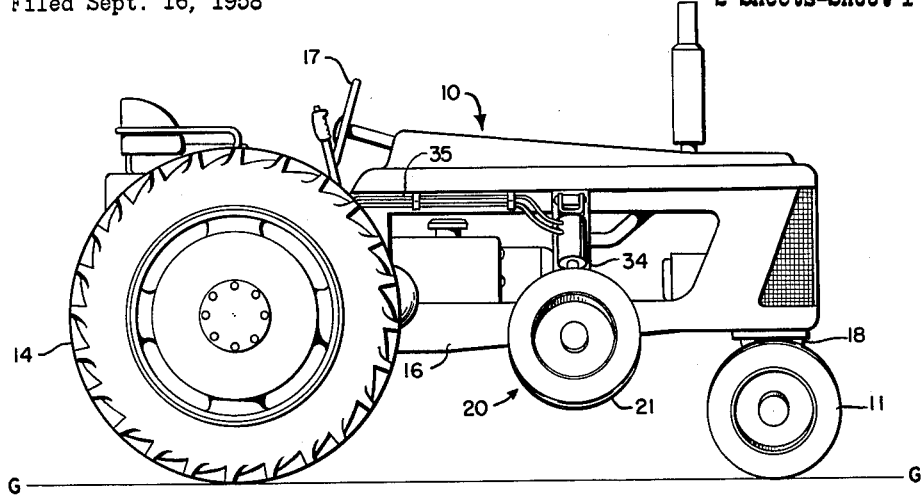
FIG. 1 is a side elevational view of a conventional tricycle type tractor with a narrow front end illustrating to advantage one embodiment of my weight transfer device attached thereto in accordance with the teachings of my invention.

Turning now to the drawing and in particular to FIGURES 1 to 4 and 6 thereof, it can be seen that I have illustrated a conventional tractor of the tricycle type indicated in its entirety as 10, having front narrow tread steerable wheels 11, 12 and a pair of large rear drive wheels 14, 15 mounted on a flame 16. As customary, steering mechanism 17 operates the front wheels 11, 12 about a front main center steering post 18.

Figure 3:
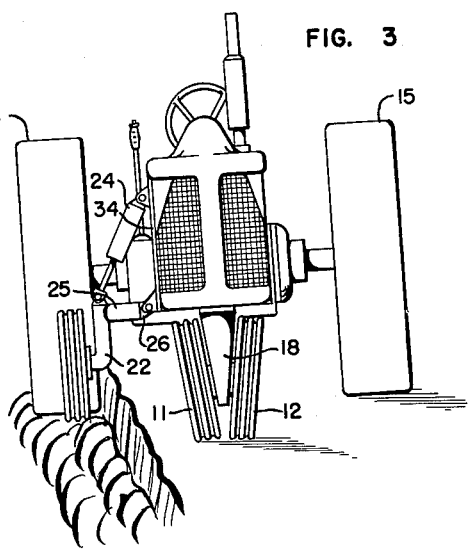
FIG. 3 is a front elevational view of a conventional tractor, as shown in FIGS. 1 and 2, in its practical operation with one wheel in the furrow and showing how my invention operates to transfer the weight of the tractor to the high wheel.

During normal operation such as plowing, it is usual for the tractor 10 to be tilted as on a slope or in a previously plowed furrow with one of the drive wheels, such as 14, low and the other drive wheel 15 on the higher or unplowed ground. Thus, as illustrated in FIG. 3, when the tractor is so tilted, the weight of the tractor normally available for traction for the two wheels 14 and 15 is shifted towards the low wheel 14 leaving the other wheel 15 with reduced traction. This problem becomes particularly acute where the ground beneath the high wheel 15 is sandy or moist.

As previously mentioned, to combat this loss of traction it is conventional to fill the tires with liquid or to attach weights on the high wheel or to have a bar attached in some manner to the frame 16 so that weights may be attached to tend to force, as a lever, the high wheel towards the ground.

Figure 2:
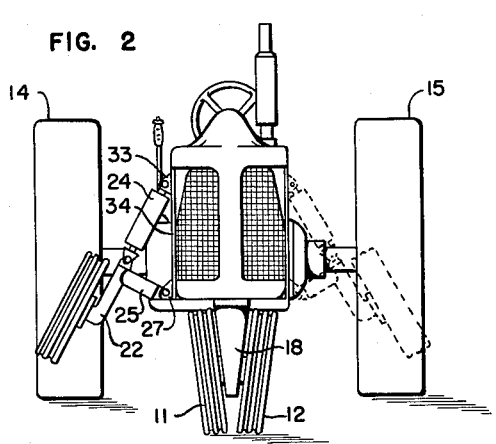
FIG. 2 is a front elevational view of a conventional tractor showing the weight transfer device shown in FIG. 1 and illustrating how my invention can be placed on one side or the other, or both, as desired.
Figure 4:
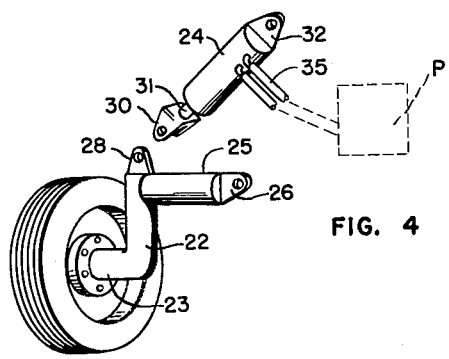
FIG. 4 is an enlarged detail view illustrating the operational mechanism to project or retract the wheel.

This problem of loss of traction has been solved by my invention which, in the embodiment disclosed in FIGS. 1 to 4 and 6, a weight transfer device, indicated in its entirety as 20 and comprises an auxiliary wheel 21 mounted on S-shaped axle member 22 having the outer end or spindle 23 for horizontal rotation of wheel 21 pivotally attached to frame 16, and actuated by a hydraulic power actuated piston mechanism 24. At the inner or right end of a horizontal attaching bar 25 of S-shaped axle 22, as shown in FIG. 4 of the drawings, I have provided a yoke or tongue 26 to be operatively attached to clevis 27 on the frame 16 (see FIGS. 1-3) by which the spindle 23 may be pivotally attached to the frame. At the outer or left end of the horizontal bar 25, I have provided a yoke or tongue 28 which is operatively attached to a clevis 30 which is in turn attached to one end of a piston rod 31 of the hydraulic power mechanism 24. Power mechanism 24 is in turn attached by a similar tongue 32 and clevis 33 to a vertically extending bar 34 and near the top of the frame 16 of the tractor as illustrated in FIG. 2. Thus the entire device may be actuated by hydraulic pressure from the conventional tractor hydraulic system P (shown in lotted lines in FIGURE 4), the lines 35 of which are illustrated.

Figure 6:
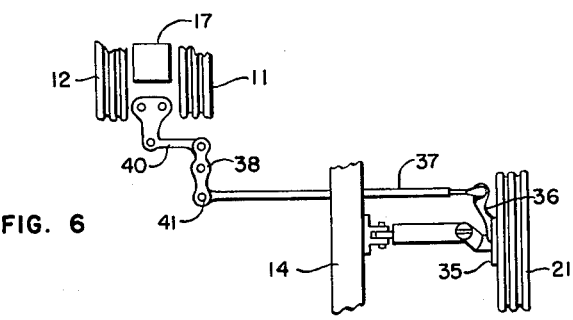
FIG. 6 is a semi-schematic illustration of the means for steering the wheel used on the tractor illustrated in FIGS. 1 to 4.

Thus, as can be appreciated, the operation of the hydraulic mechanism 24 will raise or lower the wheel 21 as from a non operative position as illustrated in FIG. 2 to the operative position as illustrated in FIG. 3 and vice versa. As can be appreciated further, if hydraulic pressure force is applied to the hydraulic mechanism 24, the wheel 21 of my weight transfer device tends to exert an inclined force on the tractor body crosswise thereof from its low side which will urge the tractor body to the right as illustrated in FIG. 3 so that the weight of the tractor is transferrel to the high wheel; the action and reaction of the hydraulic mechanism 24 with wheel 21 and the tractor body being augmented by the placement of tongue 32 and clevis 33 high on the tractor, as illustrated in FIGS. 1-3. In this manner the weight of the tractor is continually applied to the high wheel 15; this being important to my invention namely the weight is transferred before the loss of traction occurs. To fit all conditions of tread as well as to regulate the amount of force available to the wheel 21, the horizontal bar 25 is of telescoping type, as illustrated in FIG. 4 with the conventional hole and pin construction being used to lock the bar in its selected position.

Where convenient or desirable, as schematically illustrated in FIG. 6, the wheel 21 is made steerable by providing the spindle 23 of S-shaped axle member 22 with a pivot means 35 and arm 36 whereby wheel 21 may be pivoted about its vertical axis and by providing a spindle steering arm 37 pivotally attached to arm 36 and which in turn is connected about the pivot point 38 attached to the frame 16 as illustrated schematically in FIG. 6. In this manner when the wheels 11, 12 are turned by the turning of steering post 18 the steering linkage 40, 41 will turn the wheel 21 as can be appreciated.

Figure 5:
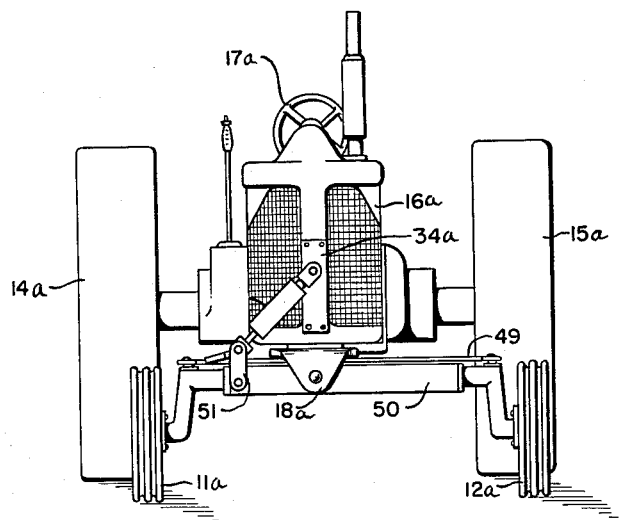
FIG. 5 is a front elevational view of a conventional wide tread front end tractor and illustrating the incorporation of another embodiment of my invention whereby one of the front wheels acts as a weight transfer device.
Figure 7:
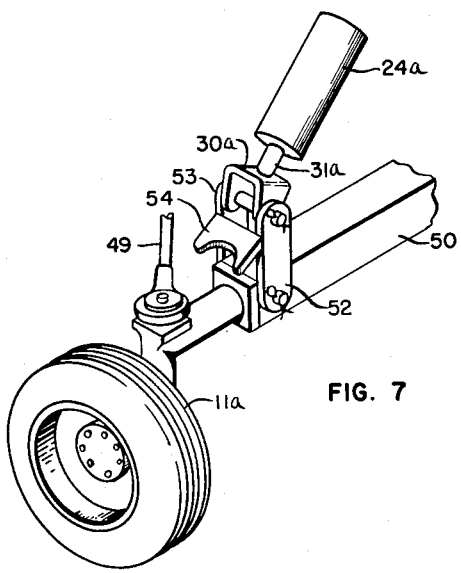
FIG. 7 is an enlarged detailed view of the coupling means forming a part of my invention as illustrated in FIG. 5.

Turning now to FIGURES 5 and 7 where I have illustrated the principle of my invention in connection with the standard tractor with wide tread front wheels. Since the details of the construction of the tractors illustrated in FIGS. 1-4, 6 and 5 and 7 are conventional and similar, I have indicated like functional parts with the same reference numerals as in connection with the tractor of FIGS. 1 through 4 and 6 except with a suffix *a*. It is to be noted, however, that in this type of conventional tractor, the tractor is steered about a steering means 18*a* with the long telescoping type horizontal axle 50 pivotally mounted thereto. The wheels 11*a*, 12*a* thus attached, pivot about their horizontal and vertical axes and are steered by rods 49.

This embodiment of my weight transfer device is distinguishable from the embodiment shown in FIGS. 1-4 and 6 in that it is attached directly to the wheel 11*a* or 12*a* without the use of an auxiliary wheel but by the actuation of the hydraulic power piston mechanism 24*a* a bracket means, indicated in its entirety as 51 on wheel 11*a*. Bracket means 51 comprises, as more clearly shown in FIG. 7, a pair of links 52, 53 linking a clevis 30*a* to the horizontal bar 50. The clevis 20*a* is similar to the clevis 30 shown in FIG. 1, is formed on one end of a hydraulic piston rod 31*a* and when actuated in one direction urges the clevis 30*a* downwardly whereby a shoe 54 is downwardly urged against the cross-bar 50 urging the wheel 11*a* and the reaction taken by the tractor frame 16*a* is urged upwardly or to the right as illustrated in FIG. 5 forcing the high wheel 15*a* downwardly through the tongue and clevis connection 32*a*, 33*a* mounted on plate 34*a* and high on the tractor frame 16*a*. The connection of clevis 33*a* may be made adjustable by additional bolt holes in plate 34*a* and since the construction operation of this device is otherwise the same as that described in connection with FIGS. 1 to 4 and 6, no further description thereof is deemed necessary herein.

Where I have illustrated and described my invention in connection with a weight transfer device only on one side of a tractor, it can be appreciated that the weight transfer device would work equally well on the other side where desired that the tractor be useable both ways as illustrated, for example, in dotted lines in FIG. 2, and it is important to note in connection with my invention that conventional or readily available parts may be used viz., an extra front tractor wheel, and car or wagon hydraulic piston mechanisms. Furthermore, while I have described and prefer hydraulic mechanism for the power source to transfer weight, a mechanical, electrical or an air system could be used, and while I have referred to a tractor I mean to include within that term all trucks, such as concrete and dirt hauling trucks, road graders and the like.

Where herein the various parts of my invention have been referred to as located in a right or left or an upper or lower or an inward or outward position, it will be understood that this is done solely for the purpose of facilitating description and that such references relate only to the relative positions of the parts as shown in the drawings.

Also, it is to be understood that many changes and modifications may be made without departing from the scope or spirit of the invention and the invention is defined and comprehended solely by the appended claims which should be construed as broadly as the prior art will permit.

I claim:

1. A weight transfer device for improving the traction of tractors and like vehicles when operated along unlevel ground, said device comprising a power actuatable means and a ground engaging means mounted on the vehicle body, said power actuatable means being arranged to introduce an inclined force between the ground engaging means when positioned at a location outwardly from the low side of the vehicle and a point high on the body of the vehicle which force is exerted in a direction crosswise of the tractor to transfer undue concentration of the weight of the vehicle from the low side of the vehicle, when tilted, toward the high side of the vehicle so as to improve traction of the vehicle.

2. The device claimed in claim 1 wherein the ground engaging means comprises an auxiliary wheel.

3. The device claimed in claim 1 wherein the ground engaging means comprises one of the vehicle's wheels.

4. In combination with a tractor, means for improving its traction when operated over uneven ground comprising a weight transfer device mounted on the tractor including ground engaging means located outwardly from the low side of the tractor when in position of use, and means connected between a point high on the tractor body and the ground engaging means for exerting an inclined force on the low side of the tractor body which force is exerted in a direction crosswise of the tractor to shift the tractor weight toward its high side so as to improve the traction of the tractor when so operated.

5. In combination iwth a tractor, means for improving its traction when driven while in a side-tilted disposition which tends to concentrate the weight of the tractor on its low side, said means comprising a weight transfer device mounted on the tractor which includes a wheel for engaging the ground at a location outwardly from the low side of the tractor, and means cooperating with said wheel which introduces an inclined force between said wheel and a point high on the tractor above said wheel, said force being exerted in a direction crosswise of the tractor such that the weight of the tractor is urged in a direction away from the direction of its tilt and so as to be more uniformly applied to both sides of the tractor.

6. A weight transfer device for improving the traction of tractors and the like when the tractor is driven along uneven ground, said device comprising a member for engaging the ground at a location spaced outwardly from the low side of the tractor, a support connecting said ground engaging member to the tractor, and hydraulic means connected at one end high on the tractor body and having its lower end connected to said support adjacent said ground engaging member, and means for connecting said hydraulic means with the tractor hydraulic system such that the hydraulic means can be actuated to introduce an inclined force crosswise of the tractor between said connections whereby the otherwise concentration of the weight of the tractor on the low wheel during operation on the uneven ground will be reduced and improve traction of the high wheel.

7. In combination with a tractor, weight transfer means mounted on at least one side thereof, said means including a retractable auxiliary wheel, a support pivotally connecting said auxiliary wheel to the tractor, and a hydraulic device connected between a point high on the tractor body and a point on the support for said auxiliary wheel which is disposed below said first connection point and outwardly from the side of the tractor when the auxiliary wheel is in ground engaging position, said hydraulic device communicating with the hydraulic system of the tractor for directing fluid into said hydraulic device sufficient to introduce an inclined force on the side of the tractor body and crosswise of the tractor which will shift the tractor weight from its low side in the direction of its high side when the tractor is driven over uneven ground.

8. A weight transfer device for improving the traction of tractors and the like having a body and a pair of drive wheels on opposite sides thereof, said device comprising a ground engaging member, a support therefor connecting it to the tractor and which is adapted to locate said ground engaging member outwardly from the low side of the tractor when it is driven over uneven ground and a force-exerting means connected between a point high on the tractor body above the axle of said drive wheel and a lower point on said support outwardly from the tractor body, said force-exerting means being energizable to introduce an inclined force between said points and crosswise of the tractor whereby the weight of the tractor normally transferred to the low wheel during its operation over uneven ground will be transferred therefrom toward the wheel on its high side for better traction of the tractor.

References Cited in the file of this patent

UNITED STATES PATENTS

| | | |
|---|---|---|
| 2,561,444 | Martin | July 24, 1951 |
| 2,681,709 | Miller | June 22, 1953 |
| 2,750,204 | Ohrmann | June 12, 1956 |
| 2,829,906 | Hull | Apr. 8, 1958 |
| 2,864,625 | Clements | Dec. 16, 1958 |

FOREIGN PATENTS

| | | |
|---|---|---|
| 914,116 | Germany | June 24, 1954 |